Jan. 20, 1959    R. E. UTTER    2,869,664
HYDRAULIC POWER ACTUATOR
Filed April 27, 1955
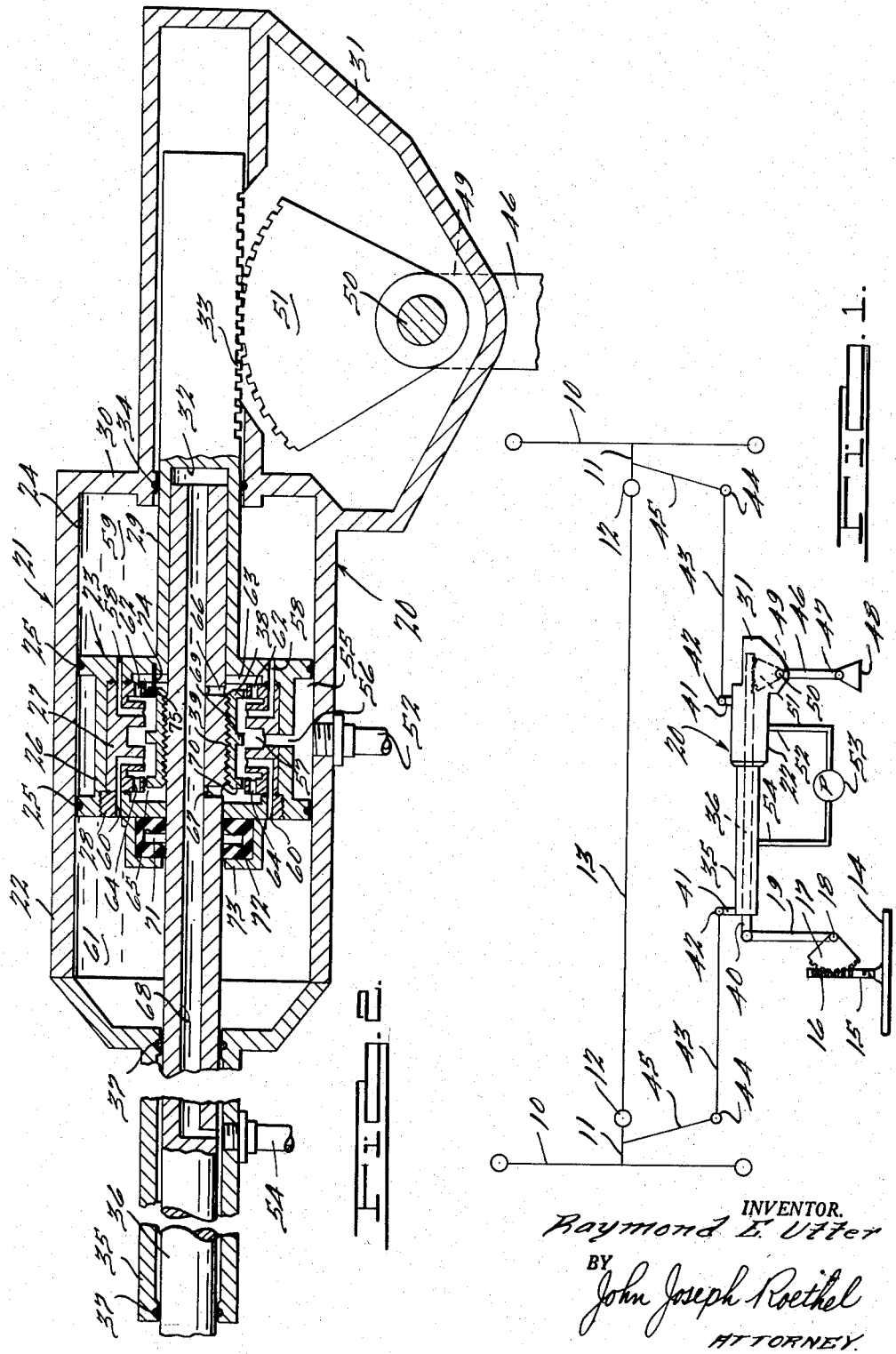
INVENTOR.
Raymond E. Utter
BY
John Joseph Roethel
ATTORNEY.

United States Patent Office 2,869,664
Patented Jan. 20, 1959

2,869,664

HYDRAULIC POWER ACTUATOR

Raymond E. Utter, Detroit, Mich.

Application April 27, 1955, Serial No. 504,315

8 Claims. (Cl. 180—79.2)

The present invention relates to an improved hydraulic actuator for transmitting and controlling the application of hydraulic power to mechanical devices and more particularly to a hydraulic actuator adapted to be utilized in a vehicular power steering system.

In general, conventional vehicular power steering, particularly as applied to automobiles, is actually "power assisted steering." That is, a "booster" device is provided to assist in steering the vehicle under adverse conditions, such as during parking maneuvers and when traversing rough or unpaved surfaces. Power steering or booster devices currently in use comprise units which are either built into the steering gear unit or are separate units attached to the steering linkage.

Booster devices which are built into the steering gear unit have at least one major disadvantage. With such an arrangement any deviation of one or both of the vehicle guiding road wheels from the desired path of travel, which deviation may be caused by said wheel or wheels striking an obstruction or being caught in a road rut, is dampened or diminished proportionately to the gear ratio of the steering gear unit. Although a relatively major deviation of the guiding wheels from the desired path of travel may be occurring, said deviation may be so dampened or diminished as not to affect the control valve system for the booster device. Thus, no corrective action will take place in the steering unless and until the vehicle operator takes action at the steering wheel.

Power steering or booster devices which are separate units attached to the steering linkage are not subject to the same criticism as units which are built into the steering gear units. Being attached directly to the steering linkage, such separate units directly reflect any deviation of the guiding road wheels. Currently, such separate units may be broadly classified into two main types, that is, those in which the hydraulic power cylinder and control valves are separate units connected by suitable fluid conduits and those in which the hydraulic power cylinder and control valves are combined in one unit. Both current types have one common characteristic of construction. They utilize what is known as a fixed piston construction in that the changes in pressure on one side or the other of the piston cause the cylinder or piston housing to be moved relatively to the piston while the piston remains stationary. In this type of construction the piston rod is connected in any suitable manner to the vehicle frame and the cylinder housing is attached to the steering linkage. The control valve, whether a separate unit from the power cylinder or combined therewith, directs the flow of fluid under pressure to the proper side of the piston to cause the desired movement of the cylinder housing. The foregoing system of attaching a separate unit to the steering linkage has not found favor because relatively bulky parts are required. The piston rod and the cylinder housing must be of sufficient length to provide full steering action. That is, the relative movement of the cylinder housing over the piston must accommodate the full turning movement of the vehicle wheels.

It is an object of the present invention to provide an improved power steering mechanism which is related to the steering linkage system, thereby not being subject to the disadvantage of the power devices which are related to the steering gear unit, but which will provide a compact and efficient unit which is a direct part of the steering linkage rather than merely being attached thereto. The power device by being a part of the steering linkage is in a position to directly reflect and control any deviations of the road wheel from their desired path of travel, the control factor being even more sensitive than that of the units which are merely attached to the steering linkage. In the improved construction and arrangement embodied in the present invention the power cylinder piston as well as the cylinder housing the same are both an integral part of the steering linkage system. The construction and arrangement of the device is such that both the piston and the cylinder housing move relatively, although at varying rates, to the vehicle frame. Further, the construction and arrangement of the improved device is such that the device, since it is a part of the steering linkage system, can have no adverse effects on the steering geometry of the vehicle.

Other objects, advantages and features embodied in the present invention will appear from the following description and appended claims, reference being had to the accompanying drawing forming a part of the specification wherein like reference characters designate corresponding parts in the several views.

Fig. 1 is a schematic diagram illustrating the present invention as applied to a vehicular steering system.

Fig. 2 is an enlarged sectional view illustrating the hydraulic actuator forming part of the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, an embodiment of the present invention as applied to a vehicular steering system. Referring to Fig. 1 there is illustrated, in part, a conventional steering mechanism arrangement comprising road wheels 10 which are carried on wheel spindles 11 pivotally connected at 12 to the vehicle axle 13. It will be understood that in an individual wheel suspension system the line 13 would schematically indicate the vehicle frame. Turning movement of the road wheels 10 is the end result of rotation of a steering wheel 14. The steering wheel 14 is mounted at the upper end of a steering column or post 15 having mounted on its lower end a worm gear 16. The gear 16 is in mesh with a gear sector 17 carried on steering gear or sector shaft 18. Sector shaft 18 has keyed thereto a pitman or steering-gear arm 19. Thus, turning force exerted on the steering wheel 14 is transmitted to the pitman 19 through the post 15, worm gear 16, gear sector 17 and sector shaft 18 and results in swinging movement of the pitman 19. In an ordinary mechanical steering system, such swinging movement of the pitman 19 is directly transmitted to the pivoted wheel spindles 11 through a suitable mechanical linkage system. The present invention relates to the incorporation of an improved hydraulic actuator, generally designated 20, into the steering system preferably between the pitman 19 and the wheel spindles 11.

In the illustrated embodiment of the invention the hydraulic actuator 20 is shown in close proximity to the pitman 19 and on the road wheels 10 side thereof. The hydraulic actuator 20 provides an efficient and simple device for providing power steering for a vehicle or the like as will become apparent as the description of the invention proceeds.

The hydraulic actuator 20 comprises a cylindrical housing 21 having an enlarged center section 22 containing a piston assembly 23 in slidable engagement with the inner wall 24 thereof, suitable piston rings 25 being provided as shown. The piston assembly 23 comprises an outer cylindrical body portion 26 which forms a housing for an insert member 27. The insert member 27 may be retained within the body portion 26 in any convenient manner as, for example, by a circular plate member 28 threadedly retained in position within the piston body portion 26.

The body portion 26 is provided with a piston extension 29 extending to the right thereof, as viewed in Fig. 2. The piston extension 29 extends through the end wall 30 of the cylindrical housing center section 22 into a longitudinally extending housing end section 31 integral with said center section. The piston extension 29 is partially hollow or bored out, as at 32, and is provided at the solid end thereof within the housing end section 31 with rack teeth 33. A suitable oil seal 34 is provided where the piston extension 29 goes through the center section end wall 30.

The cylindrical housing 21 is provided with a hollow end section 35 extending longitudinally to the left of the center section 22 thereof, as viewed in Fig. 2.

A longitudinally extending rod 36 extends through the housing end section 35 into the housing center section 22 and into the bore 32 within the piston extension 29. Suitable oil seals 37 are provided at the locations where the rod 36 goes through the various housing 21 walls. The rod 36 carries a spool 38 which is adjustably positioned on the rod 36 by threads 39.

Referring again to Fig. 1, the left end 40 of the rod 36 is shown pivotally connected to one end of the pitman 19. This provides one point of support for the hydraulic actuator 20. Two additional points of support are provided by two appendages 41 which are pivotally connected at 42 to the respective inner ends of two connecting rods 43, the respective outer ends of the rods 43 being pivotally connected at 44 to steering arms 45 operatively connected to the wheel spindles 11 in any conventional manner. A fourth point of support is provided by an auxiliary arm 46 which parallels the pitman 19. The auxiliary arm 46 is pivoted at one end 47 to a vehicle frame member 48 and at its other end 49 is journalled on a pin or shaft 50 carried by the housing extension 31. The arm 46 has a gear sector 51 immovably mounted with respect thereto so that said gear sector 51 and arm 46 are bodily swingable in unison about the arm 46 pivot axis. The gear sector 51 is in mesh with the rack teeth 33 on the piston extension 29.

The operation of the steering system herein disclosed is as follows: It will be assumed that it is desired to cause the road wheels 10 to swing in a counterclockwise direction about their respective pivot axes 12. The vehicle steering wheel 14 and steering column 15 must be rotated in a counterclockwise direction whereby the pitman 19 will be swung in a clockwise direction about its pivot axis 18. This movement of the pitman 19 results in movement of the rod 36 and spool 38 carried thereby to the right as viewed in Figs. 1 and 2.

It has been mentioned that various parts of the hydraulic actuator 20 within the housing 21 are provided with fluid passageways. It will be noted that housing 21 is illustrated as having fluid connections thereon. The connection 52 appearing at the center section 22 of the housing is the fluid inlet connection and is adapted to be supplied with fluid under pressure from a suitable pump means 53, said pump being usually driven by a power take-off from the vehicle engine. The end section 35 of the housing 21 is provided with a suitable fluid discharge connection 54 connected to the discharge side of the pump 53.

Fluid under pressure enters the housing 21 through the inlet 52 and circulates around the cylindrical body portion 26 in the space 55 between the body portion and the inner wall 24 of the housing. With the parts of the hydraulic actuator piston assembly 23 and rod 36 and spool 38 assembly in the relative positions shown in Fig. 2, the fluid would flow through fluid passageway 56 consisting of aligned orifices in the cylindrical body portion 26 and insert member 27 into the space or cavity 57 between the insert member 27 and the spool 38. From the cavity 57 the fluid flow system is provided with a multiplicity of exit passageways. Two of the visible passageways 58 lead into the housing chamber 59 to the right of the piston assembly 23, as viewed in Fig. 2. Similar passageways 60 lead into the housing chamber 61 to the left of the piston assembly 23. Another pair of visible passageways 62 lead into a cavity 63 to the right of the spool 38 and a similar set of passageways 64 lead into a cavity 65 to the left of the spool 38. Fluid from the cavities 63 and 65 is adapted to be discharged through respective passageways 66 and 67 into a longitudinally extending passageway 68 within the rod 36 and from the passageway 68 into outlet 54. From outlet 54 the fluid returns to the pump 53. In the normal neutral position of the spool 38, the position shown in Fig. 2, the fluid or hydraulic oil flows freely from the pump 53 through the channels in the piston assembly and returns to the pump without applying a differential pressure to either side of the piston.

However, when the rod 36 and spool 38 are moved to the right, as viewed in the drawing, the following occurs: Center projection 69 on the spool 38 moves to block flow of fluid from the cavity 57 into the passageways 58 and 62. Projection 70 on the left end of spool 38 blocks flow of fluid through passageway 64 into cavity 65. The result is that fluid under pressure coming in from the fluid inlet 52 flows into cavity 55 through passageway 56 into cavity 57 through passageways 60 into chamber 61 thereby increasing the pressure within chamber 61 and causing piston assembly 23 to move to the right as viewed in the drawing. The fluid in chamber 59 escapes therefrom through passageways 58 and passageways 62 into cavity 63 leading to passageway 66. From passageway 66 the flow is through passageway 68 and out the discharge connection 54. The increased pressure in chamber 61 creates a force tending to drive the piston 23 to the right. The increased pressure also creates an equal and opposite force on the end of the cylinder or housing chamber 61 tending to drive the cylinder to the left. However, the opposed forces act through unequal lever arms and the resultant force couple causes the entire steering motor assembly to move to the right. This is explained as follows: The cylinder or housing 21 is pivotally connected at 50 to the arm or link 46. Thus, the force created by the pressure exerted on the left end of the cylinder chamber 61 tending to move the cylinder 21 to the left acts through a lever arm having as its effective length the length of the link or arm 46 between the pivot centers 47 and 50. However, the force exerted on the piston 23 is transmitted through the piston extension 29 to the gear sector 51. The gear sector 51 has been described as being fixedly coupled to the link 46 at the pivot 50. Thus, the force exerted on the piston 23 operates through a lever arm equal in length to the distance between the pivot 47 and point of engagement of the rack teeth 33 with the gear sector 51. Or, stated in another way, the force exerted on the piston 23 acts through a lever arm which is equal to the length of the link or arm 46 plus the radius of the gear sector 51.

Since the force tending to move the cylinder 21 to the left creates a force couple of less magnitude than the force tending to move the piston 23 to the right, the resultant force couple tends to move the steering motor assembly to the right. The movement of the housing 21 as well as the movement of the piston assembly therewithin to the right continues until the relative positions of the housing 21, piston assembly 23 and spool 38 stabilizes again in their positions shown in Fig. 2. It will be apparent that movement of the housing 21 to the right will cause the connecting rods 43 to be moved to the right whereby force will be exerted on the steering arms 45 to cause the wheels 10 to be turned in a counterclockwise direction relative to their wheel spindle 11 pivot axes 12.

To restore the road wheels 10 to their position shown in Fig. 1, the steering wheel must be rotated in a clockwise direction about its axis of rotation causing the pitman 19 to swing counterclockwise about pivot axis 18 thereby pulling rod 36 out of the housing 21. The spool 38 will be shifted relative to the piston assembly 23 in such a manner as to cut off fluid flow into chamber 61 while permitting uninterrupted flow into chamber 59. The increased pressure in chamber 59 will cause the piston assembly 23 to move to the left and will further result in the housing 21 being bodily moved to the left, just as the increased pressure in chamber 61 resulted in movement of the housing 21 to the right. The housing movement being transmitted through connecting rods 43 and steering arms 45 to the wheel spindles 11. During the foregoing movement the fluid path will be from inlet 52 into cavity 55 through passageway 56 into cavity 57 through passageways 58 into chamber 59. The fluid in chamber 61 escapes therefrom through passageways 60, 64, 67 and 68 to outlet 54.

Thus, whenever the vehicle operator turns the steering wheel in one direction or the other a corresponding movement of the spool 38 within the piston assembly 23 occurs. This results in oil pressure being automatically applied on the proper side of the piston assembly 23 causing the same to move in a direction so as to follow the movement of the spool 38. When the piston assembly 23 moves to its original relationship with the spool 38 the system becomes stabilized and no further movement occurs. As has been explained, movement of the piston assembly 23 is reflected by movement of the actuator housing 21, which movement in turn is effective through the steering linkage system to cause the desired turning movement of the road wheels 10.

It will be readily apparent that the foregoing construction provides a device that automatically will tend to maintain the vehicle wheels in their desired path of travel should either one or both of the wheels hit an obstruction or a rut in the road which would tend to cause any deviation from said desired path of travel. For example and with reference to Fig. 1, should the right front wheel of the vehicle hit an obstruction or a road rut which would tend to cause the wheel to turn about its pivot spindle in a counterclockwise direction, the housing 21 would be pulled to the right. Since the housing 21 is connected by the pin or shaft 50 to the arm 46, movement of the housing 21 to the right would cause the arm 46 to swing about its pivot axis in a clockwise direction. Swinging movement of the arm 46 in this direction will cause the gear sector 51 thereon to coact with the rack 33 on the piston rod to cause the piston assembly 23 to be moved to the right. The relationship of the piston to the spool 38 will be disturbed to the extent that projection 69 on the spool would block the flow of fluid through passageway 60 into chamber 61 and also the flow of fluid through passageways 64, 65, 67 and 68. All of the fluid under pressure coming in through the inlet connection 52 would be directed through passageway 58 into cavity 59 and through passageways 62, 63, 66 and 68. The increased pressure within chamber or cavity 59 would be such as to drive the piston assembly 23 to the left as viewed in Fig. 2. Movement of the piston assembly 23 to the left would result in the housing also being moved to the left, this resulting from the inter-action of the rack and gear whereby the arm 46 would be swung in a counterclockwise direction carrying the housing to the left. Upon the piston assembly 23 reaching its original position of stability with respect to the spool 38, the corrective action would cease. The housing 21 and correspondingly the road wheels would be in their original direction of travel.

It may be noted that all of the foregoing corrective action has taken place without affecting the pitman arm 19. This means, of course, that as far as the vehicle operator was concerned no action on his part was required to cause such corrective action since he felt no turning movement of the steering wheel as a result of the deviation of the road wheels. Of course, the vehicle operator may notice that the vehicle has slightly changed direction to one side or the other of its original path of travel during the time that the corrective action is taking place and he may accelerate such corrective action or he may add to the corrective action by manipulating the steering wheel in order to restore the vehicle to its original position on the roadway.

In Fig. 2 there is shown a collar 71 attached to rod 36 for movement therewith. The collar 71 is surrounded by resilient material, such as a rubber envelope 72 contained within a housing 73 secured in any convenient manner to the left end of the piston assembly 23. This feature permits a certain amount of feel to be incorporated in the steering mechanism as well as providing a cushioned means for limiting the movement of the spool 38 with reference to the piston. The collar 71 attached to the rod 36 also serves to limit the movement of the piston assembly 23 relative to the rod 36 in case of oil pressure failure as in the case of failure of engine operation resulting in the non-operation of the supply pump. The same applies, of course, in case it is desired to steer the vehicle while it is being pulled or pushed without the engine operating.

As was mentioned above the spool 38 is threaded on the rod 36. Provision is made for adjusting the spool 38 longitudinally of the rod 36 by external manipulation of the rod. It will be noted that a pin 74 is shown projecting inwardly from the right end wall of the piston body portion 26 into a suitable clearance aperture 75. Thus, the spool 38 while movable longitudinally of the piston assembly 23 on the threads 39 is held in non-rotatable relationship relative thereby by the pin 74. To move the spool 38 longitudinally of the rod 36 in either direction it is only necessary to turn the rod 36 in the appropriate direction and to the degree necessary to obtain the desired position of the spool 38 longitudinally thereon.

It is believed apparent from an examination of Fig. 1 that each road wheel 10 could be under the control of an individual hydraulic actuator 20, that is, an actuator 20 on each side of the pitman 19. With such an arrangement each actuator 20 would automatically correct for deviations of its respective wheel without affecting the other actuator and wheel. For example, should the right front wheel hit a stone or other obstruction it would deviate from its desired path. The deviation of the wheel would be transmitted through the steering linkage thereby disturbing the stable relationship of the piston assembly 23 and the spool 38 in the actuator related to the right front wheel. The flow of fluid through the actuator 20 would thus be controlled to tend to restore the piston assembly and spool to stability once again. With individual actuators 20 controlling each wheel 10, the deviations and corrections of the one wheel would be independent of the other although the one steering wheel would actuate both wheels 10 when a vehicular change of direction was desired.

It will be further understood that the hydraulic actuator 20 herein described is not limited to use as a power steering mechanism but may be used wherever a mechanical linkage system is used to cause the movement of machine elements and the like and it is desired to implement pure mechanical force applications with an efficient, responsive, sensitive and readily controllable hydraulic device.

I claim:

1. In a linkage system adapted to transmit movement of a control member to a working member movably supported on a structure, a hydraulic actuator interposed in said linkage system between said control member and working member, said actuator comprising a housing having a fluid receiving chamber, a hydraulic fluid power source connected to said housing, a piston assembly movably disposed within said chamber including a piston rod having one end thereof extending through the housing at one end of said chamber, said piston rod end having a rack section thereon, a gear sector operatively engaged with said rack section, means mounting said gear sector within said housing for pivotal movement, a swinging arm pivotally connected to said housing and providing a support element for the latter, said swinging arm being pivotally mounted on said structure, said gear sector mounting means including means rigidly coupling said gear sector to said swinging arm, and valve spool means within said piston assembly, said valve spool means being mounted on a movable support rod having one end thereof projecting through the housing at the other end of said chamber, said one end of the support rod being connected to said control member for movement thereby, said valve spool means being displaceable relative to said piston assembly to direct hydraulic fluid under pressure to one side or the other side of said piston assembly, said hydraulic fluid under pressure creating forces tending to move said piston assembly and actuator housing in opposite directions, the force acting on said piston means being applied to a lever arm comprising the effective length of said swinging arm plus the radius of said gear sector and the force acting on said actuator housing being applied to a lever arm comprising only the effective length of said swinging arm, whereby the piston means force couple is of greater magnitude than the actuator housing force couple and is effective to cause bodily shiftable movement of said housing in the direction of movement of said piston means, said housing movement being effective to cause movement of said working member.

2. In a linkage system adapted to transmit movement of a control member to a working member movably supported on a structure, a hydraulic actuator interposed in said linkage system between said control member and working member, said actuator comprising a housing having a fluid receiving chamber, a hydraulic fluid power source connected to said housing, a piston assembly movably disposed within said chamber including a piston rod having one end thereof extending through the housing at one end of said chamber, said piston rod end having a rack section thereon, a gear sector operatively engaged with said rack section, means mounting said gear sector within said housing for pivotal movement, a swinging arm pivotally connected to said housing and providing a support element for the latter, said swinging arm being pivotally mounted on said structure, said gear sector mounting means including means rigidly coupling said gear sector to said swinging arm, and valve spool means within said piston assembly, said valve spool means being mounted on a movable support rod having one end thereof projecting through the housing at the other end of said chamber, said one end of the support rod being connected to said control member for movement thereby, said valve spool means being displaceable relative to said piston assembly to direct hydraulic fluid under pressure to one or the other side of said piston assembly, said hydraulic fluid under pressure creating forces tending to move said piston assembly and actuator housing in opposite directions, the force acting on said piston means being applied to a lever arm comprising the effective length of said swinging arm plus the radius of said gear sector and the force acting on said actuator housing being applied to a lever arm comprising only the effective length of said swinging arm, whereby the piston means force couple is of greater magnitude than the actuator housing force couple and is effective to cause bodily shiftable movement of said housing in the direction of movement of said piston means, said housing movement being effective to cause movement of said working member, and coacting means carried by said piston assembly and support rod effective to limit the relative movement of the valve spool means to the piston assembly.

3. In a linkage system adapted to transmit movement of a control member to a working member movably supported on a structure, a hydraulic actuator interposed in said linkage system between said control member and working member, said actuator comprising a housing having a fluid receiving chamber, a hydraulic fluid power source connected to said housing, a piston assembly movably disposed within said chamber including a piston rod having one end thereof extending through the housing at one end of said chamber, said piston rod end having a rack section thereon, a gear sector operatively engaged with said rack section, means mounting said gear sector within said housing for pivotal movement, a swinging arm pivotally connected to said housing and providing a support element for the latter, said swinging arm being pivotally mounted on said structure, said gear sector mounting means including means rigidly coupling said gear sector to said swinging arm, and valve spool means within said piston assembly, said valve spool means being mounted on a movable support rod having one end thereof projecting through the housing at the other end of said chamber, said one end of the support rod being connected to said control member for movement thereby, said valve spool means being displaceable relative to said piston assembly to direct hydraulic fluid under pressure to one side or the other side of said piston assembly, said hydraulic fluid under pressure creating forces tending to move said piston assembly and actuator housing in opposite directions, the force acting on said piston means being applied to a lever arm comprising the effective length of said swinging arm plus the radius of said gear sector and the force acting on said actuator housing being applied to a lever arm comprising only the effective length of said swinging arm, whereby the piston means force couple is of greater magnitude than the actuator housing force couple and is effective to cause bodily shiftable movement of said housing in the direction of movement of said piston means, said housing movement being effective to cause movement of said working member, and coacting means carried by said piston assembly and support rod effective to limit the relative movement of the valve spool means to the piston assembly, said last mentioned means being effective to provide a mechanical driving connection between said control member movable support rod and said housing.

4. A vehicular steering system comprising a pitman arm swingably mounted on a vehicle frame, manually operable means for swinging said pitman arm, a pivoted wheel spindle mounted on the vehicle frame, a linkage system adapted to transmit swinging movement of said pitman arm to said wheel spindle, and a hydraulic actuator forming a part of said linkage system, said actuator comprising a housing, said pitman arm forming one support element for said housing, said housing having a fluid receiving chamber, a hydraulic fluid power source adapted to supply fluid under pressure to said chamber, a piston assembly movably disposed within said chamber including a piston rod having one end thereof extending through said housing at one end of said chamber, said piston rod end having a rack section thereon, a gear sector means operatively engaged with said rack section, means supporting said gear sector within said housing for pivotal movement, a second pitman arm pivotally mounted on the vehicle frame, said second pitman arm being pivotally connected to said housing and forming a second support element for the latter, said gear sector supporting means including means fixedly coupling said gear sector to said second pitman arm, and valve spool means within said piston assembly, said valve spool means being mounted on a movable support rod having one end thereof projecting through said housing at the other end of said chamber, said one end of the support rod being connected to said first mentioned pitman arm for selective movement thereby, whereby said valve spool means is displaceable relative to said piston assembly to direct the hydraulic fluid under pressure to one side or the other side of said piston assembly, said hydraulic fluid under pressure creating forces tending to move said piston assembly and actuator housing in opposite directions, the force acting on said piston means being applied to a lever arm comprising the effective length of said second pitman arm plus the radius of said gear sector and the force acting on said actuator housing being applied to a lever arm comprising only the effective length of said second pitman arm, whereby the piston means force couple is of greater magnitude than the actuator housing force couple and is effective to cause bodily shiftable movement of said housing in the direction of movement of said piston means, said housing movement being effective to cause pivotal movement of said spindle.

5. A vehicular steering system comprising a pitman arm swingably mounted on a vehicle frame, manually operable means for swinging said pitman arm, a pivoted wheel spindle mounted vehicle frame, a linkage system adapted to transmit swinging movement of said pitman arm to said wheel spindle, and a hydraulic actuator forming a part of said linkage system, said actuator comprising a housing, said pitman arm forming one support element for said housing, said housing having a fluid receiving chamber, a hydraulic fluid power source adapted to supply fluid under pressure to said chamber, a piston assembly movably disposed within said chamber including a piston rod having one end thereof extending through said housing at one end of said chamber, said piston rod end having a rack section thereon, a gear sector means operatively engaged with said rack section, means supporting said gear sector within said housing for pivotal movement, a second pitman arm pivotally mounted on the vehicle frame, said second pitman arm being pivotally connected to said housing and forming a second support element for the latter, said gear sector supporting means including means fixedly coupling said gear sector to said second pitman arm, and valve spool means within said piston assembly, said valve spool means being mounted on a movable support rod having one end thereof projecting through said housing at the other end of said chamber, said one end of the support rod being connected to said first mentioned pitman arm for selective movement thereby, whereby said valve spool means is displaceable relative to said piston assembly to direct the hydraulic fluid under pressure to one side or the other side of said piston assembly, said hydraulic fluid under pressure creating forces tending to move said piston assembly and actuator housing in opposite directions, the force acting on said piston means being applied to a lever arm comprising the effective length of said second pitman arm plus the radius of said gear sector and the force acting on said actuator housing being applied to a lever arm comprising only the effective length of said second pitman arm, whereby the piston means force couple is of greater magnitude than the actuator housing force couple and is effective to cause bodily shiftable movement of said housing in the direction of movement of said piston means, said housing movement being effective to cause pivotal movement of said spindle, and coacting means carried by said piston assembly and support rod effective to provide a mechanical driving connection between said pitman arm and said housing in the event of hydraulic power source failure.

6. In a vehicular steering system for turning the turnable vehicle wheels relative to the vehicle frame having a pitman arm swingably attached to said vehicle frame, manually operable means for swinging said pitman arm, pivoted wheel spindles attached to said frame, a pitman idler arm pivotally attached to said frame and a linkage system adapted to transmit movement of said pitman arm to said wheel spindles; a hydraulic actuator forming a part of said linkage system, said actuator comprising a housing having a fluid receiving chamber, a hydraulic fluid power source connected to said chamber, a piston assembly movably disposed within said chamber including a piston rod having one end thereof extending through one end wall of said chamber, said piston rod having a rack section thereon, a gear sector means fixedly connected to said pitman idler arm and being operatively engaged with said rack section, means connecting said gear sector means and pitman idler arm to said housing for pivotal movement relative thereto and bodily shiftable movement therewith, and valve spool means within said piston assembly, said valve spool means being mounted on a movable support rod having one end thereof projecting through the other end wall of said chamber, said one end of the support rod being connected to said pitman arm for movement thereby, whereby said valve means is displaceable relative to said piston assembly to direct hydraulic fluid under pressure to one side or the other side of said piston assembly creating a force effective to cause movement thereof in one direction or the other, said force being opposed by a force created by said hydraulic fluid under pressure acting on the end wall of the chamber on the side of the piston to which said hydraulic fluid under pressure is being directed, said piston moving force acting through a lever arm equal to the distance between the pivot axis of said pitman idler arm and the point of engagement of said gear sector and rack section, said opposing force acting through the length of said pitman idler arm, the resultant force couple differential causing said housing to be bodily shifted in the direction of movement of said piston assembly, the movement of said housing being transmitted through said linkage system to said wheel spindles to change the direction of movement of said wheels.

7. In a vehicular steering system for turning the turnable vehicle wheels relative to the vehicle frame having a pitman arm swingably attached to said vehicle frame, manually operable means for swinging said pitman arm, pivoted wheel spindles attached to said frame, a pitman idler arm pivotally attached to said frame, and a linkage system adapted to transmit movement of said pitman arm to said wheel spindles; a hydraulic actuator forming a part of said linkage system, said actuator comprising a housing having a fluid receiving chamber, a hydraulic fluid power source connected to said chamber, a piston assembly movably disposed within said chamber including a piston rod having one end thereof extending through one end wall of said chamber, said piston rod having a rack section thereon, a gear sector means fixedly connected to said pitman idler arm and being operatively engaged with said rack section, means connecting said gear sector means and idler arm to said housing for pivotal movement relative thereto and bodily shiftable movement therewith, and valve spool means within said piston assembly, said valve spool means being mounted on a movable support rod having one end thereof projecting through the other end wall of said chamber, said one end of the support rod being connected to said pitman arm for movement thereby, whereby said valve means is displaceable relative to said piston assembly to direct hydraulic fluid under pressure to one side or the other side of said piston assembly creating a force effective to cause movement thereof in one direction or the other, said force being opposed by a force created by said hydraulic fluid under pressure acting on the end wall of the chamber on the side of the piston to which said hydraulic fluid under pressure is being directed, said piston moving force acting through a lever arm equal to the distance between the pivot axis of said pitman idler arm and the point of engagement of said gear sector and rack section, said opposing force acting through the length of said pitman idler arm, the resultant force couple differential causing said housing to be bodily shifted in the direction of movement of said piston assembly, the movement of said housing being transmitted through said linkage system to said wheel spindles to change the direction of movement of said wheels, and coacting means carried by said piston assembly and support rod effective to provide an emergency mechanical driving connection between said support rod and said housing in the event of hydraulic power source failure.

8. In a vehicular steering system for turning the turnable vehicle wheels relative to the vehicle frame having a pitman arm swingably attached to said vehicle frame, manually operable means for swinging said pitman arm, pivoted wheel spindles attached to said frame, a pitman idler arm pivotably attached to said frame, and a linkage system adapted to transmit movement of said pitman arm to said wheel spindles; a hydraulic actuator forming a part of said linkage system, said actuator comprising a housing having a fluid receiving chamber, a hydraulic fluid power source adapted to supply fluid under pressure to said chamber, a piston assembly movably disposed within said chamber including a piston rod having one end thereof extending through one end wall of said chamber, said piston rod end having a rack section thereon, a gear sector operatively engaged with said rack section, means fixedly connecting said gear sector to said pitman idler arm, means pivotally connecting said gear sector and pitman idler arm to said housing for pivotal movement relative thereto and for bodily shiftable movement therewith, and valve spool means within said piston assembly, said valve spool means being mounted on a movable support rod having one end thereof projecting through the other end wall of said chamber, said one end of the support rod being connected to said pitman arm for selective movement thereby, whereby said valve spool means is displaceable relative to said piston assembly to direct hydraulic fluid under pressure to one side or the other side of said piston assembly to create a force effective to cause movement thereof in one direction or the other, said force being opposed by a force created by said hydraulic fluid under pressure acting on the end wall of the chamber on the side of the piston to which said hydraulic fluid under pressure is being directed, said piston moving force acting through a lever arm equal to the distance between the pivot axis of said pitman idler arm and the point of engagement of said gear sector and rack section, said opposing force acting through the length of said pitman idler arm, the resultant force couple differential causing said housing to be bodily shifted in the direction of movement of said piston assembly, the movement of said housing being transmitted through said linkage system to said wheel spindles to change the direction of movement of said wheels, and coacting means carried by said piston assembly and support rod effective to limit the relative movement of the valve spool means to the piston assembly, said last mentioned means being effective to provide a mechanical driving connection between said pitman arm and said housing in the event of hydraulic power source failure.

References Cited in the file of this patent

UNITED STATES PATENTS

| | | |
|---|---|---|
| 1,874,248 | Davis | Aug. 30, 1932 |
| 2,193,898 | Carter et al. | Mar. 19, 1940 |
| 2,676,663 | Smith | Apr. 27, 1954 |
| 2,711,797 | Muller | June 28, 1955 |
| 2,797,764 | Wysong | July 2, 1957 |